United States Patent
He et al.

(10) Patent No.: US 8,133,441 B2
(45) Date of Patent: Mar. 13, 2012

(54) APPARATUS AND PROCESS FOR METAL OXIDES AND METAL NANOPARTICLES SYNTHESIS

(75) Inventors: Hong He, Beijing (CN); Hongxing Dai, Beijing (CN); Xuehong Zi, Beijing (CN)

(73) Assignee: Beijing University of Technology, Beijing (CN)

( * ) Notice: Subject to any disclaimer, the term of this patent is extended or adjusted under 35 U.S.C. 154(b) by 1278 days.

(21) Appl. No.: 11/777,090

(22) Filed: Jul. 12, 2007

(65) Prior Publication Data
US 2010/0025224 A1    Feb. 4, 2010

(30) Foreign Application Priority Data
Jul. 19, 2006 (CN) .......................... 2006 1 0088817

(51) Int. Cl.
*B06B 1/00*    (2006.01)
(52) U.S. Cl. ............................................. 422/128
(58) Field of Classification Search .................. 205/334; 204/334, 157.42; 422/128, 20; 266/170
See application file for complete search history.

(56) References Cited

U.S. PATENT DOCUMENTS

| | | | | |
|---|---|---|---|---|
| 2,940,831 A * | 6/1960 | Nossardi et al. | ............... | 422/128 |
| 5,417,995 A * | 5/1995 | Tomita et al. | ............... | 426/330.6 |
| 6,209,855 B1 * | 4/2001 | Glassford | ..................... | 210/150 |
| 6,719,449 B1 * | 4/2004 | Laugharn et al. | ............. | 422/128 |
| 6,866,831 B2 * | 3/2005 | Nakao et al. | ................... | 422/205 |
| 6,884,278 B2 * | 4/2005 | Shimizu et al. | ................. | 75/255 |
| 2003/0024878 A1 * | 2/2003 | Baltussen et al. | ............. | 210/634 |
| 2005/0032240 A1 * | 2/2005 | Lee et al. | ....................... | 422/100 |
| 2005/0119423 A1 * | 6/2005 | Bergman et al. | ................ | 526/68 |
| 2005/0271731 A1 * | 12/2005 | Suzuki et al. | .................. | 424/489 |
| 2006/0096715 A1 * | 5/2006 | Suzuki et al. | ................... | 159/31 |

FOREIGN PATENT DOCUMENTS

| | | |
|---|---|---|
| EP | 1537846 A1 * | 6/2005 |
| WO | WO 9736674 A1 * | 10/1997 |
| WO | WO 2004030799 A1 * | 4/2004 |

OTHER PUBLICATIONS

Wang, Lian-Yan et al, "Preparation of uniform sized chitosan microspheres by membrane emulsification technique and application as a carrier of protein drug," J. of Controlled Release 106 (2005), pp. 62-75.*
Kosvintsev et al, "Liquid—Liquid Membrane Dispersion in a Stirred Cell with and without Controlled Shear," Ind. Eng. Chem. Res. 2005, 44, pp. 9323-9330.*
J. Wagner et al., "Generation of metal nanoparticles in a microchannel reactor" 2003 Elsevier B.V., Chemical Engineering Journal 101 (2004), pp. 251-260.
Andrew J. De Mello, "Control and detection of chemical reactions in microfluidic systems" 2006 Nature Publishing Group, Insight Review, Nature, vol. 442, Jul. 27, 2006, pp. 394-402.

* cited by examiner

*Primary Examiner* — Keith D. Hendricks
*Assistant Examiner* — Colleen M Raphael
(74) *Attorney, Agent, or Firm* — J.C. Patents (57) ABSTRACT

The present invention provides an approach to control the generation and grow of nanocrystal with membrane diffusion method and related apparatuses to produce inorganic oxide nanopowders and metal nanoparticles. With this method, the size and size distribution of inorganic oxide nanopowders and metal nanoparticles can be tuned. It overcomes the shortcomings possessed by the common chemical and physical method of preparing nanoparticles.

17 Claims, 8 Drawing Sheets

APPARATUS AND PROCESS FOR METAL OXIDES AND METAL NANOPARTICLES SYNTHESIS

CROSS-REFERENCE TO RELATED APPLICATION

This application claims priority benefit of China application No. 200610088817.4 filed on Jul. 19, 2006, the contents of which is hereby incorporated by reference in its entirety.

BACKGROUND

1. Field of the Invention

The present invention relates to a process and an apparatus for synthesizing inorganic metal oxide nanopowders and metal nanoparticles (colloid). The nanoparticles can be used as precursors to prepare nanocatalysts and nanomaterials.

2. Description of Related Art

Nanoparticle is accumulation or cluster of atoms about 1 to 100 nm length and increasingly important material used in various areas ranging from nano-technology, non-line optics, diode laser, smart sensor, information store, gene sequencing to catalysis. During the past decades, a lot of methods have been developed for preparing nanoparticles. For example, Microwave/sonication-assisted Coprecipitation, Sol-Gel Process, Hydrothermal/Solvothermal methods, Templated Syntheses, Revise Microemulsion, Hydrolyzation, and Spray Pyrolysis have been used to synthesize metal oxide nanopowders; Vapor Deposition, Mechanical Attrition, Laser Ablation, Electrochemical Reduction, Radiolysis Reduction, Chemical reduction, and Alcohol Reduction have been employed to prepare metal nanoparticles. However, some methods mentioned above require very expensive equipments, some of them lack the ability in the precise control in the generation and growth of nanocrystals, resulting in the wide distribution of nanoparticle size. In addition, some chemical methods often involve reduction of the relevant metal salts or decomposition of organometallic precursor in the presence of a suitable surfactant that is expensive.

In order to control precisely the generation rate and growth of nanocrystal for preparing nanoparticles with narrow size distribution, several new apparatuses and processes have been developed recently for the synthesis of nanoparticles, especially for the synthesis of metal nanoparticle.

Microfluidic system has been proven to be an idea medium for nanoparticles production because both mass and thermal transfer are rapid and then the nucleation of solute molecules and growth of nanocrystal can be precisely controlled (Nature, 442, 27 Jul. 2006). Wagner used microchannel reactor to generate Au nanoparticles with the size of 11.7 nm±0.9 nm (Chemical Engineering Journal 101 (2004) 251-260). Although microfluidic method can be used to produce nanoparticles with narrow size distribution and get great attention, it is insurmountable difficult to use it to prepare metal nanoparticles in large-scale.

In summary, the available methods of preparing inorganic metal oxide and metal nanoparticles, especially for metal nanoparticles, are very costly and difficult to produce nanoparticles with narrow size distribution in large-scale.

Accordingly, there remains a great need for fabricating methods of inorganic metal oxide nanopowders and metal nanoparticles with narrow size distribution. There also remains a need for methods to control growth of inorganic metal oxide nanopowders and metal nanoparticles in the process of mass-production.

SUMMARY OF THE INVENTION

The present invention provides an approach to control the generation and growth of nanocrystal with a membrane diffusion method and related apparatuses to produce inorganic oxide nanopowders and metal nanoparticles. With this method, the size and size distribution of inorganic oxide nanopowders and metal nanoparticles can be tuned. It overcomes the shortcomings possessed by the common chemical and physical method of preparing nanoparticles.

BRIEF DESCRIPTION OF THE DRAWINGS

The above-mentioned and/or other aspects and advantages of the present apparatus will become apparent and the invention will be better understood by reference to the following description of the embodiments thereof taken in conjunction with the accompanying drawings.

DETAILED DESCRIPTION OF THE INVENTION

Reference will now be made to the drawings to describe in detail of the apparatus for producing inorganic metal oxide nanopowders and metal nanoparticles according to the present invention.

Figure 1:
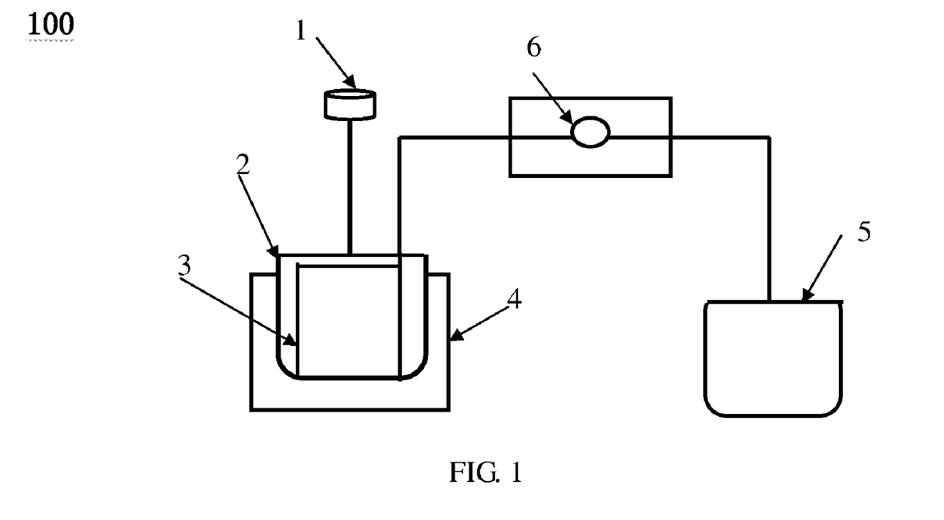
FIG. 1 is a schematic view of an apparatus referring to batch reactor for preparing inorganic metal oxide nanopowders and metal nanoparticles in accordance with an embodiment of the present invention.
Figure 2:
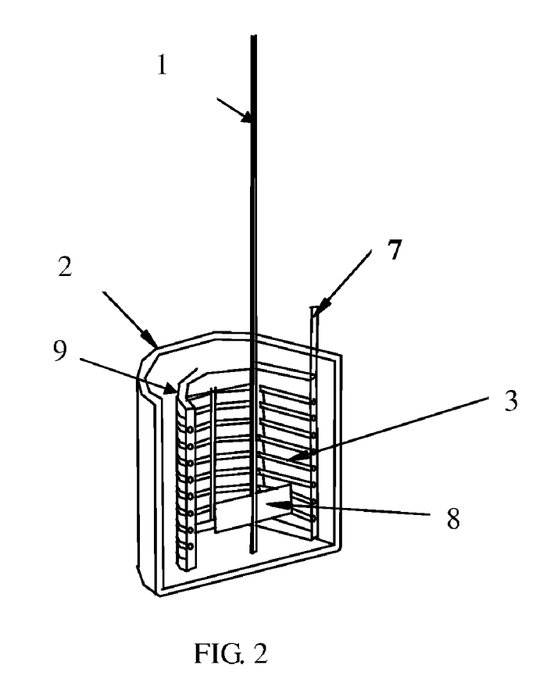
FIG. 2 is a cross-section view of the batch reactor with ceramic or polymer micro-membrane tube unit installed inside of it.

Referring to FIG. 1 and FIG. 2, an apparatus 100 for producing inorganic oxide nanopowder and metal nanoparticles according to the embodiment of the present invention is shown. The apparatus 100 includes a stirrer 1, a batch reactor 2, a micro-membrane tube unit 3, an ultrasonic generator 4, a container 5 and a measuring pump 6. The micro-membrane tube unit 3 is installed in the batch reactor 2. The micro-membrane tube unit 3 is composed of a tube holder 9 made of Teflon and a Polyethersulfone membrane tube that is fixed on the tube holder 9. As an example, the inner and outer diameters as well as the length of a specific Polyethersulfone membrane tube used in one embodiment of this invention are 0.7, 1.3 and 4000 mm, respectively, with the tube wall thickness of 0.3 mm and micro-hole diameter of 0.04 μm on the tube wall. One end of the Polyethersulfone membrane tube is sealed, for example, by epoxy resin and the other is open as inlet 7 that is connected with the measuring pump 6 by a tube line. An oar 8 is installed at the end of the stirrer axis that reaches into the space surrounded by the micro-membrane tube unit 3. As the apparatus 100 is employed to synthesize inorganic metal oxides nanopowders and metal nanoparticles, the batch reactor 2 is set up with the ultrasonic generator 4. The measuring pump 6 is linked with container 5 with a tube line.

Figure 3:
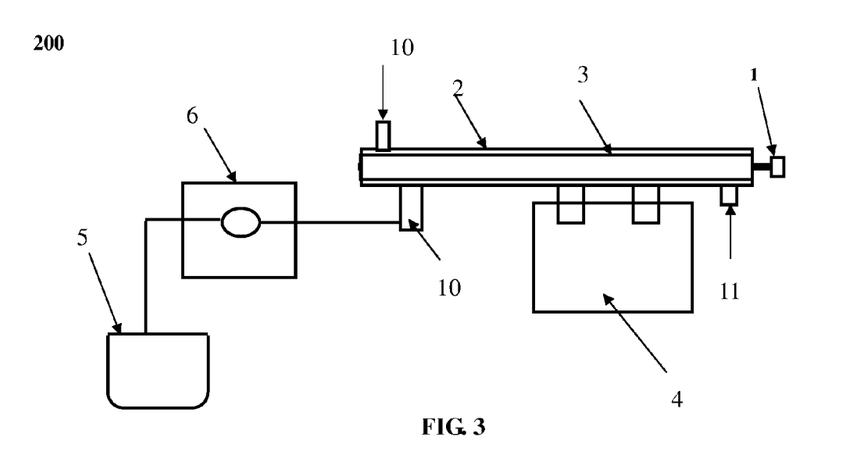
FIG. 3 is a schematic view of an apparatus referring to a tubal reactor for mass-preparing inorganic metal oxide nanopowders and metal nanoparticles in accordance with an embodiment of the present invention.
Figure 4:
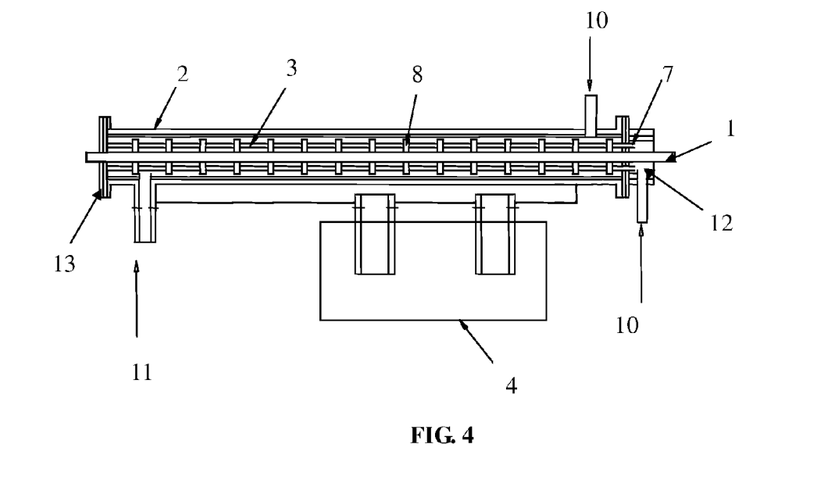
FIG. 4 is a cross-section view of the tubal reactor used for mass-preparing nanoparticles, inside of which a ceramic or polymer micro-membrane tube unit is installed.

Referring to FIG. 3 and FIG. 4, an apparatus 200 with a tubal reactor 2 for mass-production of inorganic oxide nanopowders and metal nanoparticles according to the embodiment of the present invention is shown. The apparatus 200 includes a stirrer 1, a tubal reactor 2, a micro-membrane tube unit 3 which can be made of ceramic or polymer, or other suitable materials, an ultrasonic generator 4, a container 5 and a measuring pump 6. The tubal reactor 2 is connected with the ultrasonic generator 4 and has one outlet 11 at one end and two inlets 10 at the other end of the tubal reactor 2, one inlet 10 is connected to the measuring pump 6. The micro-membrane tube unit 3 with a stirrer 1 is installed inside of the tubal reactor 2. The micro-membrane tubes 3 are fixed, for example by epoxy resin, on two seal caps 13 that are used to seal the reactor 2. One end of the micro-membrane tube is also sealed by the seal cap 13 and the other is open as an inlet 7 that is linked to inlet 10 of the tubal reactor 2 via a cavity 12 and to the measuring pump 6 via the inlet 10. The measuring pump 6 is connected with container 5 by a tube line.

Figure 5:
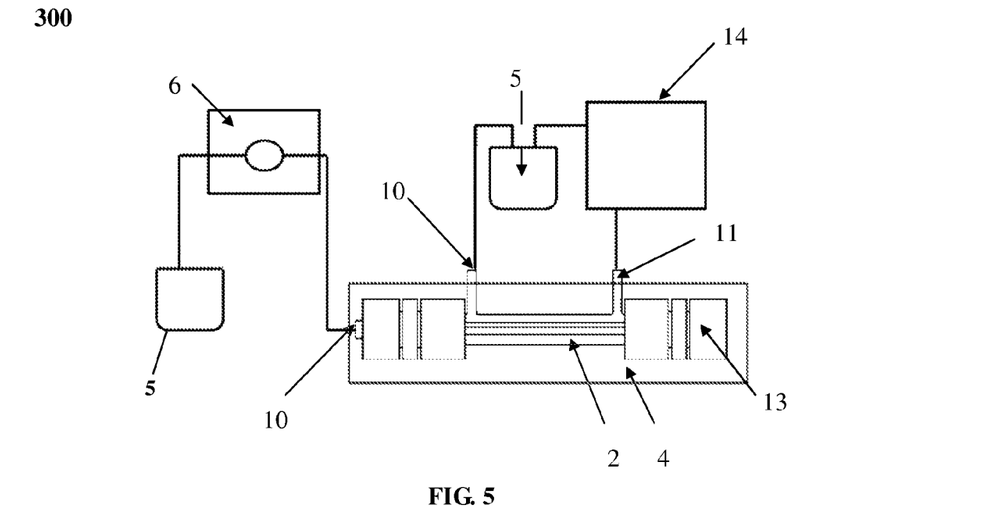
FIG. 5 and FIG. 6 are a schematic view of an apparatus referring to a tubal reactor for preparing inorganic metal oxide nanopowders and metal nanoparticles in accordance with an embodiment of the present invention.
Figure 6:
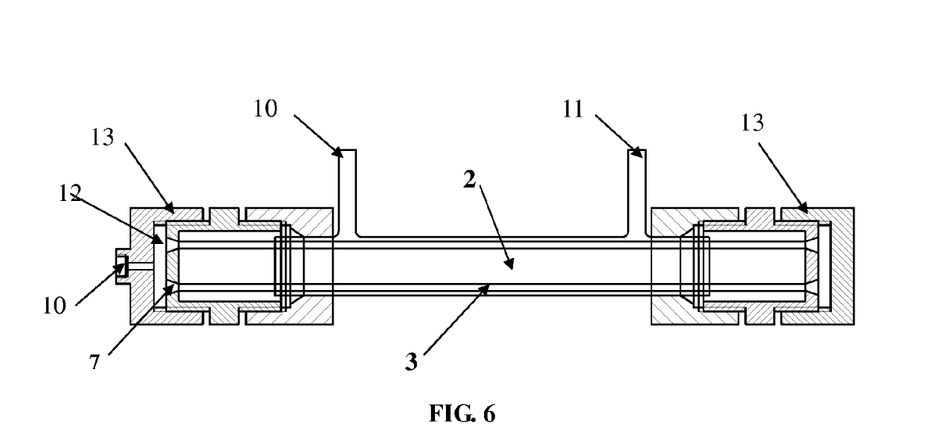

Referring to FIG. 5 and FIG. 6, an apparatus 300 for producing inorganic oxide nanopowder and metal nanoparticles according to the embodiment of the present invention is shown. The apparatus 300 includes a tubal reactor 2, a micro-membrane tube unit 3, an ultrasonic generator 4, two containers 5, a measuring pump 6 and a peristaltic pump 14. The tubal reactor 2 has two inlets 10 and one outlet 11, one of the inlets 10 is connected with the first container 5 and the other inlet 10 is connected to the measuring pump 6 that is linked to the second container 5. The outlet 11 is linked with a peristaltic pump 14 that is also connected with container 5. The peristaltic pump 14, first container 5 and tubal reactor 2 form a loop-way. The micro-membrane tubes 3 are fixed, for example by epoxy resin, on two sealed caps 13 that are used to seal the butal reactor 2. One end of the micro-membrane tube is also sealed by the seal cap 13 and the other is open as an inlet 7 that is linked to inlet 10 of the tubal reactor 2 via a cavity 12 and to the measuring pump 6 via the inlet 10. The measuring pump is also connected with the second container 5 by a tube line.

Figure 7:
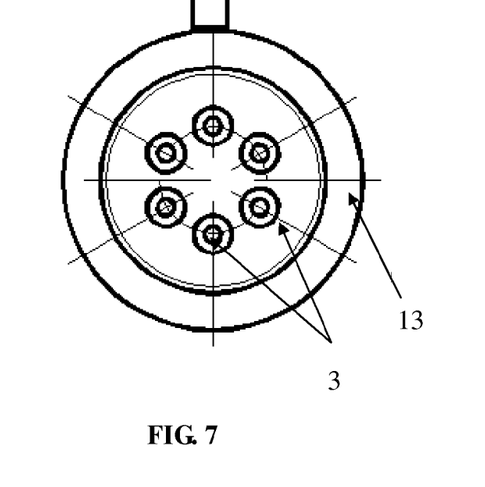
FIG. 7 is a cross-section view of an apparatus referring to the tubal reactor for preparing inorganic metal oxide nanopowders and metal nanoparticles in accordance with an embodiment of the present invention.

Referring to FIG. 7, the micro-membrane tube unit 3 comprises micro-membrane tubes that are made of ceramic or polymer materials and located at a circle line around the dummy central axis of the tubal reactor 2.

Referring to FIG. 4 and FIG. 7, the micro-membrane tube unit 3 comprises micro-membrane tubes that are made of ceramic or polymer materials. The micro-holes are formed on walls of the micro-membrane tubes, and the size of the micro-holes on the walls of the micro-membrane tubes is ranged from 0.03 to 0.3 μm. One example of the ceramic micro-membrane tubes is that made of $\alpha$-$Al_2O_3$. The inner and outer diameters as well as the length of a specific ceramic micro-membrane tube used in one embodiment of this invention are 3, 4 and 200 mm, respectively, with the tube wall thickness of 0.5 mm and micro-hole diameter of 0.04 μm. The polymer micro-membrane tubes can be made of a polymer material selected from the group consisting of polypropylene, polyethermide, polysulfone, Polyethersulfone and polyvinylidene fluoride.

Figure 8:
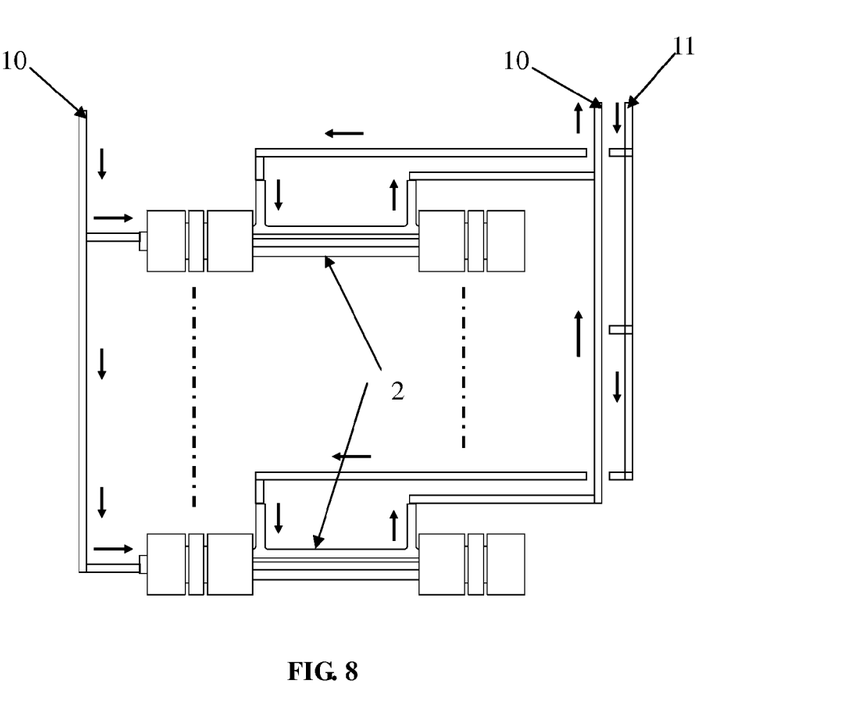
FIG. 8 is a schematic view of an apparatus referring to assembled tubal reactors in parallel connection for mass production of inorganic metal oxide nanopowders and metal nanoparticles.

Referring to FIG. 8, as the butal reactor 2 being employed, an advantage of the invention is that the yield of inorganic oxide nanopowders and metal nanoparticles can be enhanced simply by increasing the number of butal reactors 2 without the negative effect caused by expanding the volume of reactor.

Referring to FIG. 1, a method of preparing inorganic metal oxide nanopowders and metal nanoparticles is the process described as the following:

(I) The desired metal precursor(s) is (are) dissolved in distilled water in the presence or absence of a protective agent. The solution of the desired metal precursor(s) is transferred into the batch reactor 2, the solution of a reductant/precipitator is transferred into the container 5;

(II) The solution of the precipitator or reductant stored in container 5 is injected into the lumens of micro-membrane tube unit 3 via the measuring pump 6 from the inlet 7 of the micro-membrane tube unit 3 at a desired flow rate, temperature, stirring speed and a desired supersonic frequency, and then diffuses into inside of the batch reactor 2 via the micro-holes distributed on the wall of the micro-membrane tube unit 3. In reactor 2, which contains a solution of a metal precursor with or without protective agent, the precipitation or reduction occurs.

(III) As the invention method is used to synthesize inorganic metal oxides, the precipitation reaction is carried out for 2-8 hours, and then the precipitate is filtered, washed with distilled water, dried in air and calcined at desired temperature for 2-8 hours, giving the product of inorganic metal oxides nanoparticles.

(IV) When the inventive method is used to prepare metal nanoparticles, the reduction reaction is not stopped until 5-20 times amount of reductant as the metal ion amount is injected into the batch reactor 2. The resulting liquid is a colloid of metal nanoparticles with narrow metal particle size distribution.

Referring to FIG. 3 and FIG. 4, a method of preparing inorganic metal oxide nanopowders and metal nanoparticles in mass scale is the process described as the following:

(I) The desired metal precursor(s) is (are) dissolved in distilled water in the presence or absence of a protective agent. The solution flows via the inlet 10 that is linked with measuring pump 6 into the reactor 2 that is used for mass-preparing inorganic metal oxide nanopowers and metal nanoparticles; the solution of reductant/precipitator is transferred into the container 5;

(II) The solution of precipitator/reductant driven by a measuring pump 6 is injected through the inlet 9 and inlet 7 into the lumens of micro-membrane tube unit 3, at a desired flow rate, stirring speed and a desired supersonic frequency, and then diffuses into inside of the tubal reactor 2 via the micro-holes distributed on the wall of the micro-membrane tube unit 3. The reaction occurs immediately.

(III) As the invention method is used to synthesize inorganic metal oxides, the ration time in the tubal reactor for the reactive solution is from 2 to 8 hours, giving the products flowed out from outlet 11. And then the product (metal oxide precursor nanoparticles) are filtered, washed with distilled water, dried in air and calcined at desired temperature for 2-8 hours, giving inorganic metal oxides nanoparticles.

(IV) When the inventive method is used to prepare metal nanoparticles, the reactive solution flows out from the outlet 11, at which the concentration of reductant is 5-20 times as that of metal components injected into the tubal reactor 2, giving a colloid of metal nanoparticles with narrow metal particle size distribution.

Referring to FIG. 5 and FIG. 6, the tubal reactor 2 and other related equipments can be set up according to another way. The peristaltic pump 14, container 5 and tubal reactor 2 form a loop. An aqueous solution of metal precursor(s) with or without protective agent is recycled through the tubal reactor 2 and container 5, driven by a peristaltic pump 14.

In an embodiment of the invention, for the batch or tubal reactor 2, flow rate of the solution driven by measuring pump 6 is from 0.2 to 100 ml/min; the rotate speed of the stirrer is from 100 to 200 r/min; the supersonic frequency is from 60 to 120 KHz.

The approach of preparing inorganic metal oxide nanopowders and metal nanoparticles can be accomplished in another way: solution of precipitator or reductant is transferred into the reactor 2. Correspondingly, the solution of metal salts is kept in container 5 and injected by measuring pump 6 into the solution of precipitator or reductant via the micro-holes distributed on the wall of the micro-membrane tube unit 3.

In another embodiment of the invention, the solution of the metal precursor and protective agent is obtained by dissolving inorganic or organic metal salts of rare earth metals, alkaline-earth metals and transition group metals with protective agent in distilled water.

In a further embodiment the precipitation reagent are selected form the group consisting of $NH_4OH$, $NaOH$ and oxalic acid.

In a further embodiment the reductants are selected from the group consisting of $NaBH_4$, $N_2H_4 \cdot H_2O$, $N_2H_4$, formaldehyde, Oxalic acid and Ascorbic acid.

The inorganic metal oxide nanopowders or metal nanoparticles prepared by this invention is small in size and uniform in narrow size distribution with low cost and ability in controlling the generation and growth of nanoparticles in the process of crystallization

EXAMPLE 1

Figure 9:
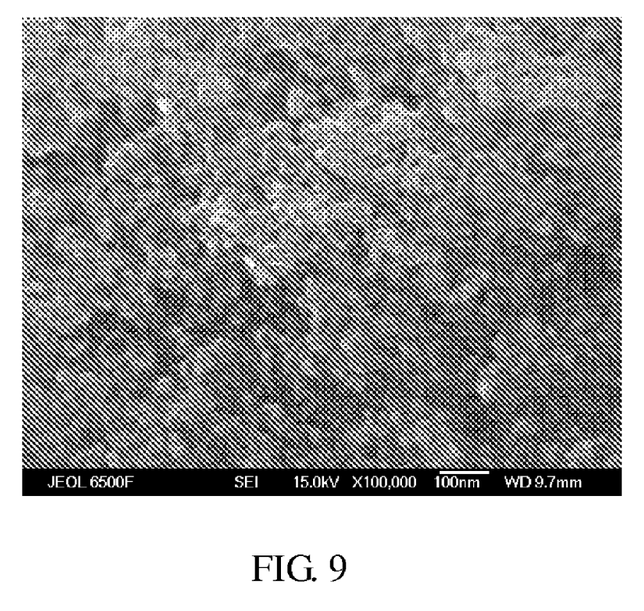
FIG. 9 is a SEM (Scanning electron microscope) image of the $Ce_{0.6}Zr_{0.4}O_2$ nanomaterial that was prepared by the method described in the invention.
Figure 10:
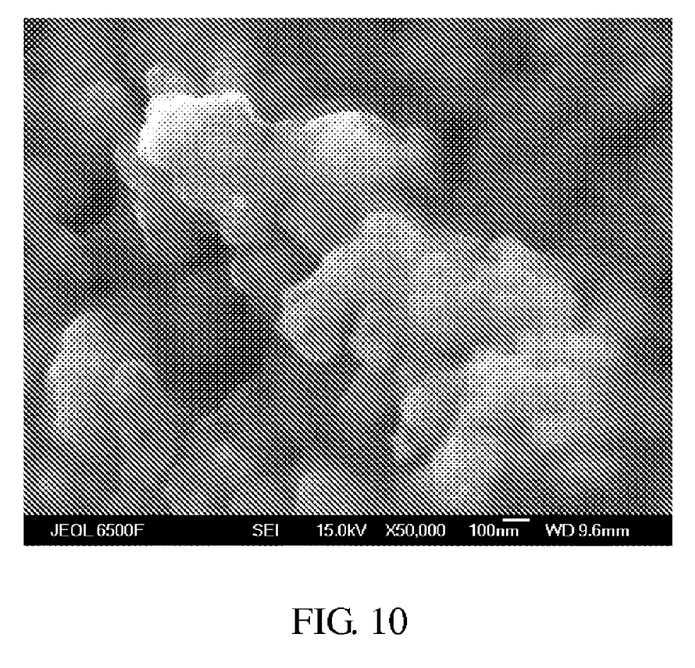
FIG. 10 is a SEM image of the $Ce_{0.6}Zr_{0.4}O_2$ nanomaterial that was prepared by common coprecipitation method.

In this experiment, 51.2 g of $Ce(NO_3)_3 \cdot 6H_2O$ and 14.6 g of $ZrONO_4$ were dissolved in 300 ml distilled water and transferred into the batch reactor 2. The batch reactor 2 was dipped in an ultrasonic generator 4 at frequency of 60 KHz and temperature of 60° C. The rotate speed of the stirrer 1 is 100 r/min. A desired amount of $NH_4OH$ solution was injected into the lumens of membrane micro-tube unit 3 at a constant rate of 0.2 ml/min by a measuring pump 6 and then diffused into the mixture solution of $Ce(NO_3)_3 \cdot 6H_2O$ and $ZrONO_4$ via the micro-holes on the wall of membrane micro-tube unit 3 until the pH=10 of the solution in the batch reactor 2. The precipitation of metal oxide precursor (hydroxid) occurred, yielding a buff color precipitate. The precipitate was filtered, washed with distilled water, and dried in air at 110° C. for 10 hours, and then calcinated at 550° C. for 4 hours, giving the products of $Ce_{0.6}Zr_{0.4}O_2$ nanoparticles with particle size of 10 nm and specific surface area of 108 $m^2/g$ (FIG. 9). The $Ce_{0.6}Zr_{0.4}O_2$ nanoparticles prepared by the method described in the invention were smaller in size with narrow size distribution than the $Ce_{0.6}Zr_{0.4}O_2$ solid solution synthesized by common coprecipitate method (FIG. 10). The oxygen storage determined by $H_2$—$O_2$ titration of the former was larger (0.757 mmol/g) than that (0.357 mmol/g) of the later.

EXAMPLE 2

Figure 11:
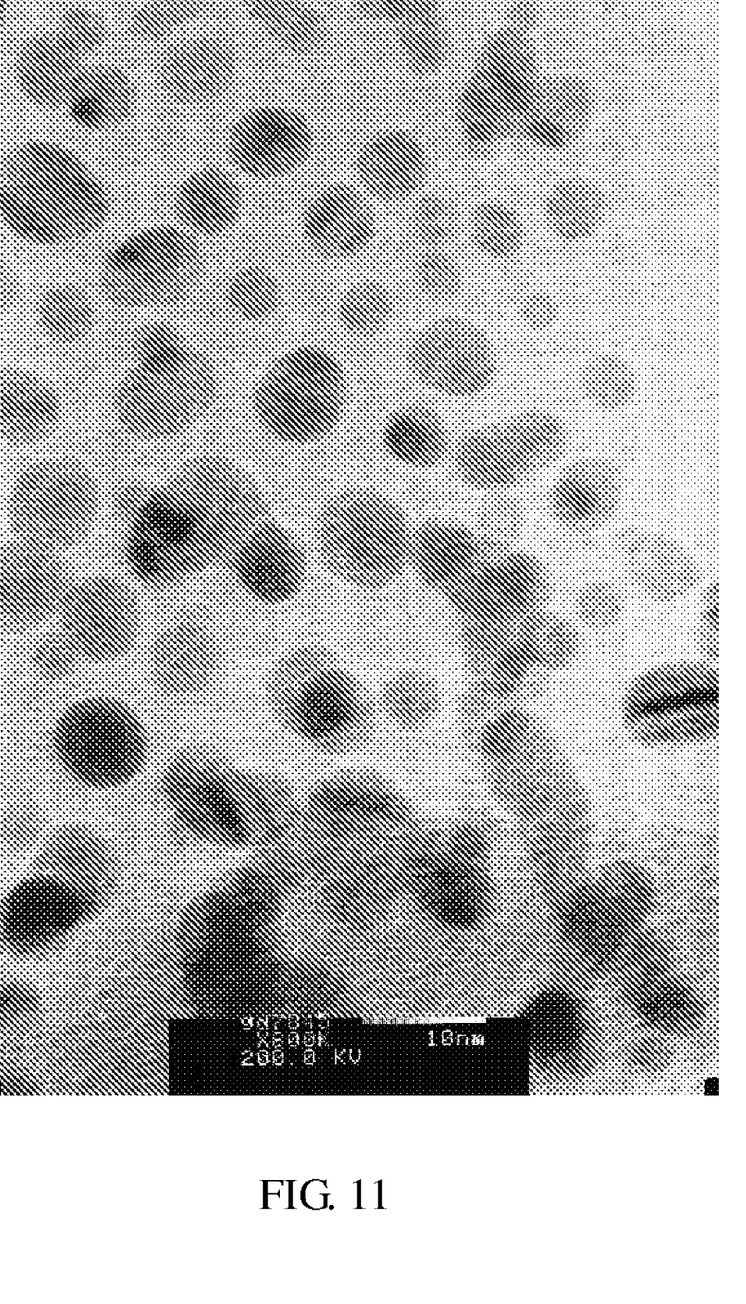
FIG. 11 is a TEM (transmission electron microscope) image of Ag nanoparticles produced according to the batch reactor used in the present invention.
Figure 12:
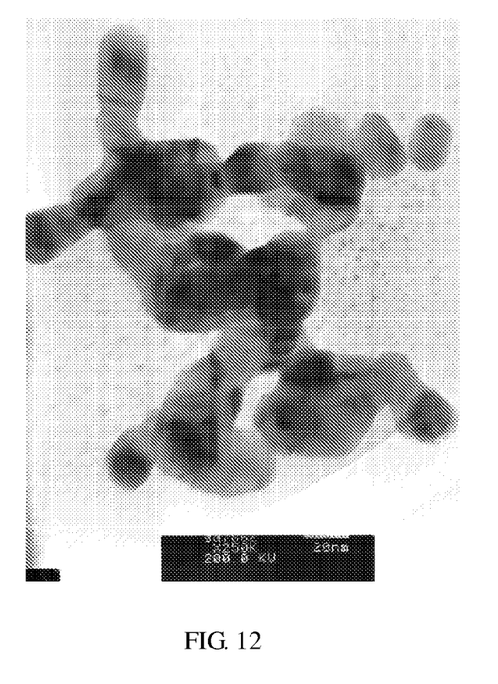
FIG. 12 is a TEM image of Ag nanoparticles produced according to normal chemical reduction method, i.e. the Ag nanoparticles was generated by dropping the $NaBH_4$ solution into a mixture solution of $AgNO_3$ and Polyvinyl Pyrrolidone (PVP).

In this experiment, 0.16 g of $AgNO_3$ and 60 g of Polyvinyl Pyrrolidone (PVP, molecular weight is 30000) were dissolved in 300 ml distilled water and transferred into the batch reactor 2. 0.53 g of $NaBH_4$ was dissolved in 30 ml distilled water and transferred into the container 5. The batch reactor 2 was dipped in an ultrasonic bath 4 at frequency of 120 KHz and the temperature of 60° C. At same time, $NaBH_4$ solution was injected into the lumens of membrane micro-tube unit 3 at a constant rate of 1.2 ml/min by a measuring pump 6 and then diffused into the mixture solution of $AgNO_3$ and PVP via the micro-holes on the wall of membrane micro-tube unit 3. The rotate speed of the stirrer 1 is 200 r/min. The Ag nanoparticles with size of 5-8 nm (FIG. 11) were produced with uniform size distribution, which is smaller than that produced by common chemical reduction of $AgNO_3$ (FIG. 12)

EXAMPLE 3

Figure 13:
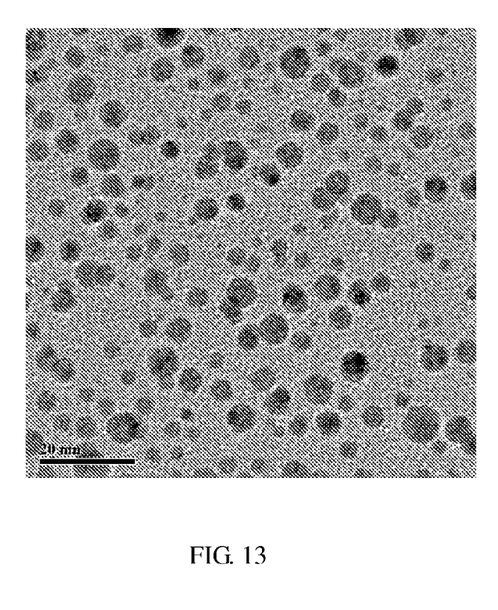
FIG. 13 is a TEM image of Au nanoparticles produced according to the batch reactor used in the present invention.

In this experiment, 0.836 g of $HAuCl_4$ and 24 g of Polyvinyl Pyrrolidone (PVP, molecular weight is 30000) were dissolved in 500 ml distilled water, and then transferred into the batch reactor 2. 1.16 g of $NaBH_4$ was dissolved in 50 ml distilled water and transferred into the container 5. The batch reactor 2 was dipped in an ultrasonic generator (100 KHz) 4 at the temperature of 50° C. At same time, $NaBH_4$ solution was injected into the lumens of membrane micro-tube unit 3 at a constant rate of 1 ml/min by a measuring pump 6 and then diffused into the mixture solution of $AgNO_3$ and PVP via the micro-holes on the wall of membrane micro-tube unit 3, resulting the $Au^{3+}$ reduction occurred. The rotate speed of the stirrer 1 is 150 r/min. In the end of this process, the color of the solution turned to be wine-reddish color, giving the Au nanoparticles with quite narrow uniform size distribution. The average size of Au nanoparticles was 3.5 nm (FIG. 13).

EXAMPLE 4

Figure 14:
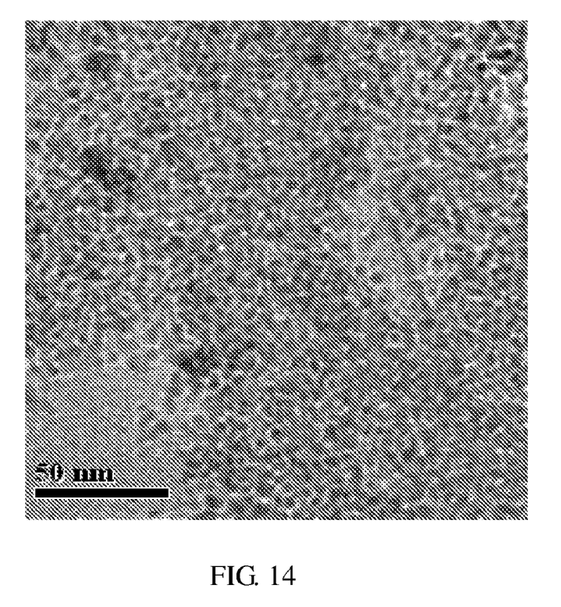
FIG. 14 is a TEM image of AuRh alloy nanoparticles produced according to the batch reactor used in the present invention.

In this experiment 8.8 g of $NaBH_4$ was dissolved in 120 ml distilled water. 3.18 g of $HAuCl_4$, 3.75 g of $RhCl_3$ and 139 g of Polyvinyl Pyrrolidone (PVP, molecular weight is 30000) were dissolved in 1000 ml distilled water. The solutions of $NaBH_4$ and metal salts ($HAuCl_4$ and $RhCl_3$) with PVP were transferred into the container 5 and batch reactor 2, respectively. The batch reactor 2 was dipped in an ultrasonic bath at frequency of 80 KHz and the temperature of 40° C. At same time, $NaBH_4$ solution was injected into the lumens of membrane micro-tube unit 3 at a constant rate of 3.5 ml/min by a measuring pump 6 and then diffused into the mixture solution of metal salts and PVP via the micro-holes on the wall of membrane micro-tube unit 3, resulting the $Au^{3+}$ and $Rh^{3+}$ reduction occurred. The rotate speed of the stirrer 1 is 100 r/min. In the end of this process, the color of the solution turned to be brown-reddish color, giving the AuRh (Au:Rh=1:1) alloy nanoparticles with quite narrow uniform size distribution. The average size of AuRh (Au:Rh=1:1) alloy nanoparticles was 2 nm (FIG. 14).

EXAMPLE 5

Figure 15:
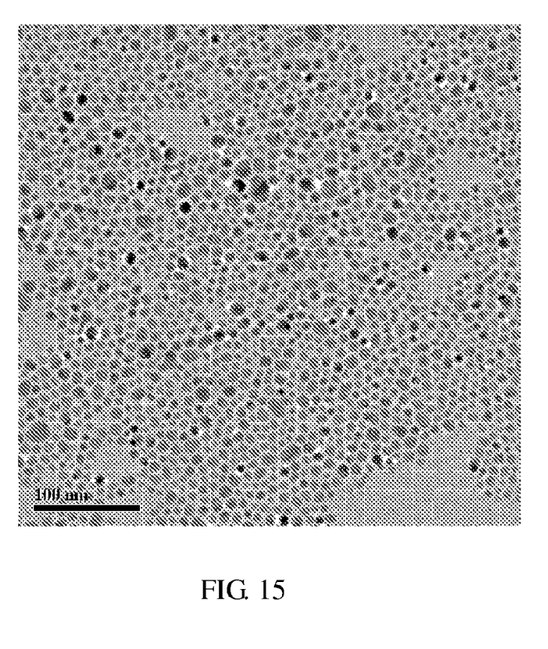
FIG. 15 a TEM (transmission electron microscope) image of Ag nanoparticles produced according to the tubal reactor used in the present invention.

In this experiment, 1.0 g of NaBH$_4$ was dissolved in 50 ml DI water (indicated as solution A). 0.2 g of AgNO$_3$ and 1.2 g of Polyvinyl Pyrrolidone (PVP, molecular weight is 30000) were dissolved in 200 ml distilled water (indicated as solution B). The solution A and B were transferred into the two containers 5 respectively. And then, solution B was recycled through the butal reactor 2 and the container 5, in which the solution B was stored, at flow rate of 600 ml/min driven by the peristaltic pump 14. The tubal reactor 2 was dipped in an ultrasonic generator 4 at frequency of 100 KHz and temperature of 40° C. At same time, solution A was inject into the lumens of membrane micro-tube unit 3 at a constant rate of 7 ml min$^{-1}$ by a measuring pump 6 and diffused into solution B via the micro-holes on the wall of membrane micro-tube unit 3, resulting the Ag$^+$ reduction occurred. In the end of this synthesis process, the color of the solution turned to be reddish, giving the Ag nanoparticles with quite narrow uniform size distribution. The average size of Ag nanoparticles was 6.5 nm (FIG. 15).

What is claimed is:

1. An apparatus for producing inorganic metal oxide nanopowders and metal nanoparticles, comprising:
    a stirrer, a measuring pump, a reactor, a micro-membrane tube unit, a container, and an ultrasonic generator;
    wherein the micro-membrane tube unit is installed in the reactor, the reactor is coupled to the ultrasonic generator at a controlled temperature and frequency, the micro-membrane tube unit is connected via an inlet with the measuring pump that is linked to the container, the stirrer has an oar and is installed in the reactor, and wherein the micro-membrane tube unit comprises a plurality of micro-membrane tubes around a central axis of the reactor and are arranged along an axial direction of the central axis, micro-holes are formed on walls of the micro-membrane tubes, the size of the micro-holes on the walls of the micro-membrane tubes is ranged from 0.03 to 0.3 μm, and the oar of the stirrer is located within a space surrounded by the micro-membrane tubes.

2. The apparatus of claim 1, wherein the reactor is a batch reactor, the ultrasonic generator is an ultrasonic bath, the batch reactor is dipped into the ultrasonic bath.

3. The apparatus of claim 1, wherein the micro-membrane tubes are made of α-Al$_2$O$_3$ or a material selected from the group consisting of polypropylene, polyethermide, polysulfone, Polyethersulfone and polyvinylidene fluoride.

4. The apparatus of claim 1, wherein a thickness of the micro-membrane tubes is in the range of 0.3-0.5 mm.

5. An apparatus for producing inorganic metal oxide nanopowders and metal nanoparticles, comprising:
    a tubal reactor;
    a micro-membrane tube unit comprising a plurality of micro-membrane tubes arranged around a central axis of the tubal reactor;
    an ultrasonic generator coupled to the reactor; and
    a stirrer with an oar provided in the tubal reactor along the central axis of the tubal reactor and located within a space surrounded by the micro-membrane tubes;
    wherein the micro-membrane tubes comprise a closed end and an inlet, and the inlet is coupled to a measuring pump; micro-holes are formed on the walls of the micro-membrane tubes, the size of the micro-membrane holes is ranged from 0.03 to 0.3 μm.

6. The apparatus of claim 5, wherein the micro-membrane tubes are fixed by epoxy resin on two sealing caps that are used to seal the tubal reactor.

7. The apparatus of claim 6, wherein one end of the micro-membrane tubes is sealed by the sealing cap and the other end of the micro-membrane tubes is open forming the inlet coupled to the measuring pump that is connected with a first container.

8. The apparatus of claim 5, comprising two or more the tubal reactors arranged in parallel, wherein inlets of the tubal reactors are connected to a common inlet and outlets of the tubal reactors are connected to a common outlet.

9. The apparatus of claim 5, wherein the stirrer comprises a plurality of oars arranged along the central axis of the tubal reactor.

10. The apparatus of claim 5, wherein a sealed cavity is provided at an end of the tubal reactor which is separated from a main chamber of the tubal reactor by a sealing cap, the cavity is in fluid communication with the inlet of the micro-membrane tubes and the measuring pump.

11. The apparatus of claim 5, wherein the tubal reactor comprises an inlet and an outlet, the outlet of the tubal reactor is connected to a peristaltic pump that is connected to a second container, and the second contained is connected to the inlet of the tubal reactor, so as to form a loop for a reaction solution to circulate therein.

12. The apparatus of claim 5, wherein a thickness of the micro-membrane tubes is in the range of 0.3-0.5 mm.

13. An apparatus for producing inorganic metal oxide nanopowders and metal nanoparticles, comprising a plurality of tubal reactors arranged in parallel;
    wherein each of the tubal reactors is connected with an ultrasonic generator and contains therein a plurality of micro-membrane tubes arranged around a central axis of the tubal reactor, micro-holes are formed on walls of the micro-holes are formed on the walls of the micro-membrane tubes, the size of the micro-membrane holes is ranged from 0.03 to 0.3 μm, and a stirrer with an oar is provided within a space surrounded by the micro-membrane tubes;
    wherein an inlet of each of the tubal reactors is connected to a common inlet and an outlet of each of the tubal reactors is connected to a common outlet; and
    wherein an inlet of the micro-membrane tubes in each of the tubal reactors is connected to another common inlet that is coupled to a measuring pump.

14. The apparatus of claim 13, wherein the stirrer comprises a plurality of oars arranged along the central axis of each of the tubal reactors.

15. The apparatus of claim 13, wherein a sealed cavity is provided at an end of each of the tubal reactors which is separated from a main chamber of the tubal reactor by a sealing cap, the cavity is in fluid communication with said another common inlet and with the inlet of the micro-membrane tubes in a corresponding tubal reactor.

16. The apparatus of claim 13, wherein the common outlet of the tubal reactors is connected to a peristaltic pump that is connected to a second container, and the second container is connected to the common inlet of the tubal reactors, so as to form a loop for a reaction solution to circulate therein.

17. The apparatus of claim 13, wherein a thickness of the micro-membrane tubes is in the range of 0.3-0.5 mm.

* * * * *